United States Patent [19]

Tatami

[11] 4,389,663
[45] Jun. 21, 1983

[54] APPARATUS FOR INDICATING THE PHASE OF THE COLOR SUBCARRIER SIGNAL IN EACH LINE OF A COLOR TELEVISION SIGNAL

[75] Inventor: Mitsushige Tatami, Ebina, Japan

[73] Assignee: Sony Corporation, Tokyo, Japan

[21] Appl. No.: 274,260

[22] Filed: Jun. 16, 1981

[30] Foreign Application Priority Data

Jun. 26, 1980 [JP] Japan .................................. 55-87140

[51] Int. Cl.³ .......................... H04N 9/46; H04N 5/76
[52] U.S. Cl. ...................................... 358/19; 358/320;
358/326; 360/36.1
[58] Field of Search ........................ 358/16, 17, 18, 19,
358/20, 25, 8, 16, 320, 326, 325; 360/36.1, 36.2

[56] References Cited
U.S. PATENT DOCUMENTS 3,990,103 11/1976 Stalley et al. .................... 358/226 X
4,024,571 5/1977 Dischert et al. .................. 358/19 X
4,261,008 4/1981 Waller et al. .......................... 358/19

4,313,129 1/1982 Fukui ....................................... 358/8

Primary Examiner—Robert L. Richardson
Attorney, Agent, or Firm—Lewis H. Eslinger; Alvin Sinderbrand

[57] ABSTRACT

Apparatus is provided for indicating the phase of the color subcarrier signal present during each line of a color television signal so as to identify whether that line is odd or even. A phase detector detects the phase of the color subcarrier signal at a predetermined time following the occurrence of the horizontal synchronizing signal. The actual time at which the phase of the color subcarrier signal is detected is adjusted by an automatic phase adjustment circuit which senses relative phase shifts between the horizontal synchronizing signal and the color subcarrier signal. Preferably, the phase detector is a sampling circuit which samples the color subcarrier signal at a sampling time which is adjustable by the automatic phase adjustment circuit so as to cancel relative phase shifts between the sampling time and the color subcarrier signal.

16 Claims, 2 Drawing Figures

FIG.1

APPARATUS FOR INDICATING THE PHASE OF THE COLOR SUBCARRIER SIGNAL IN EACH LINE OF A COLOR TELEVISION SIGNAL

BACKGROUND OF THE INVENTION

This invention relates to apparatus for indicating the phase of the color subcarrier signal of a color television signal and, more particularly, to such apparatus which is capable of producing a line identification signal to identify whether the horizontal line interval of the color television signal is odd or even, in accordance with the detected phase polarity of the color subcarrier signal.

In conventional television systems, such as the NTSC system, the chrominance subcarrier signal is modulated with color information. The phase of this chrominance subcarrier signal is shifted from line-to-line. For example, and with reference to the NTSC system, the phase of the chrominance subcarrier signal is inverted at each horizontal line interval. Thus, for odd-numbered lines, the phase of the chrominance subcarrier signal may be considered to be "positive", and then, for the next-following even-numbered lines, the phase of this chrominance subcarrier signal is inverted and may be considered to be "negative". That is, during odd-numbered lines, the chrominance subcarrier signal may be thought of as exhibiting 0° phase, and during even-numbered lines, the chrominance subcarrier signal may be thought of as exhibiting 180° phase.

In various signal processing techniques, such as in video recording/reproducing applications, time base error correction applications, and the like, it is important to identify the phase of the chrominance subcarrier signal during each line interval. It has been proposed that a line identification signal be produced, indicating whether the line of color television signals is odd (and, thus, the chrominance subcarrier signal exhibits 0° phase) or is even (and, thus, the chrominance subcarrier signal exhibits 180° phase). This odd/even identification of the line of video signals thus identifies the relative phase of the chrominance subcarrier signal.

Typically, in a composite color television signal, the burst signal, which is provided on the back porch of the horizontal synchronizing signal, is phase- and frequency-locked to the chrominance subcarrier signal in that line interval. The line identification signal thus may be obtained by detecting the relative phase of the burst signal. It has been thought that this phase detection can be achieved by using the horizontal synchronizing signal as a reference point, and then sensing the phase of the burst signal at a predetermined time from this reference point. For example, if the burst signal is shaped to be substantially rectangular, a first phase (e.g. 0°, or positive phase) is detected if the burst signal exhibits a positive, or relatively higher level when sensed, and a second phase is detected when the burst signal exhibits a negative, or relatively lower level, when sensed. The detected first phase thus is representative of an odd line, and the detected second phase is representative of an even line.

However, in the foregoing, the phase of the burst signal is sensed, or sampled, at a predetermined time following the occurrence of the horizontal synchronizing signal. For example, the burst signal may be sampled at a predetermined time following the trailing edge transition of the horizontal synchronizing signal. Unfortunately, phase shifts may occur between the horizontal synchronizing signal and the burst signal, due to various factors in the transmission or reception of the color television signal. Furthermore, changes in the response characteristics of the phase-detecting circuitry may occur due to temperature drift, thus resulting in an erroneous line identification. As a consequence of the foregoing, it has become difficult to obtain stable, accurate phase detection of the burst signal and, thus, it has become difficult to produce accurate line identification signals.

OBJECTS OF THE INVENTION

Therefore, it is an object of the present invention to provide improved apparatus for identifying line intervals of a color television signal which avoids the aforenoted disadvantages.

Another object of this invention is to provide improved apparatus which is of relatively simple construction, and which indicates the phase of the chrominance subcarrier signal of a color television signal.

A further object of this invention is to provide apparatus for detecting the phase of the burst signal of a composite color television signal, which phase detection is not deleteriously affected by phase shifts.

An additional object of this invention is to provide apparatus for producing a line identification signal to identify whether a horizontal line interval of a color television signal is odd or even, which line identification signal is substantially immune to spurious noise interference.

A still further object of this invention is to provide apparatus for detecting the phase of a color burst signal included in a composite color television signal, which apparatus uses the horizontal synchronizing signal as a reference, and which accounts for and compensates phase shifts that may occur between the horizontal synchronizing signal and the color burst signal, and which further compensates the effects of changes in circuit response due to, for example, temperature drift or the like.

Yet another object of this invention is to provide apparatus of the aforenoted type in which phase shifts are sensed and compensated only during certain line intervals.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for indicating the phase of the chrominance subcarrier signal of a color television signal, wherein the phase of the chrominance subcarrier signal is detected at a predetermined time following the occurrence of the horizontal synchronizing signal of the color television signal. An automatic phase adjustment circuit is provided for sensing relative phase shifts between the horizontal synchronizing signal and the chrominance subcarrier signal and for adjusting the actual time in which the phase of the chrominance subcarrier signal is detected in accordance with the sensed relative phase shifts.

In accordance with a desirable feature of this invention, the detected phase of the chrominance subcarrier signal is used to produce a line identification signal which identifies whether a line interval of the color television signal is odd or even. The phase of the chrominance subcarrier signal is detected by sampling that signal with a sampling pulse which is generated in response to the horizontal synchronizing signal. The time of occurrence of the sampling pulse is adjusted in the event of relative phase shifts between the horizontal synchronizing signal and the chrominance subcarrier signal, or in the event of changes in circuit response which result in a shift in the proper time of occurrence of the sampling pulse.

In accordance with another aspect of this invention, a noise immunity circuit is provided for producing a line identification signal which is substantially immune to spurious noise interference.

In accordance with another aspect of this invention, the automatic phase adjustment circuit is operative only during those line intervals in which the chrominance subcarrier signal exhibits a predetermined phase relationship, for example, only during odd line intervals.

BRIEF DESCRIPTION OF THE DRAWINGS

The following detailed description, given by way of example, will best be understood in conjunction with the accompanying drawings in which.

DETAILED DESCRIPTION OF A CERTAIN PREFERRED EMBODIMENT

Figure 1:
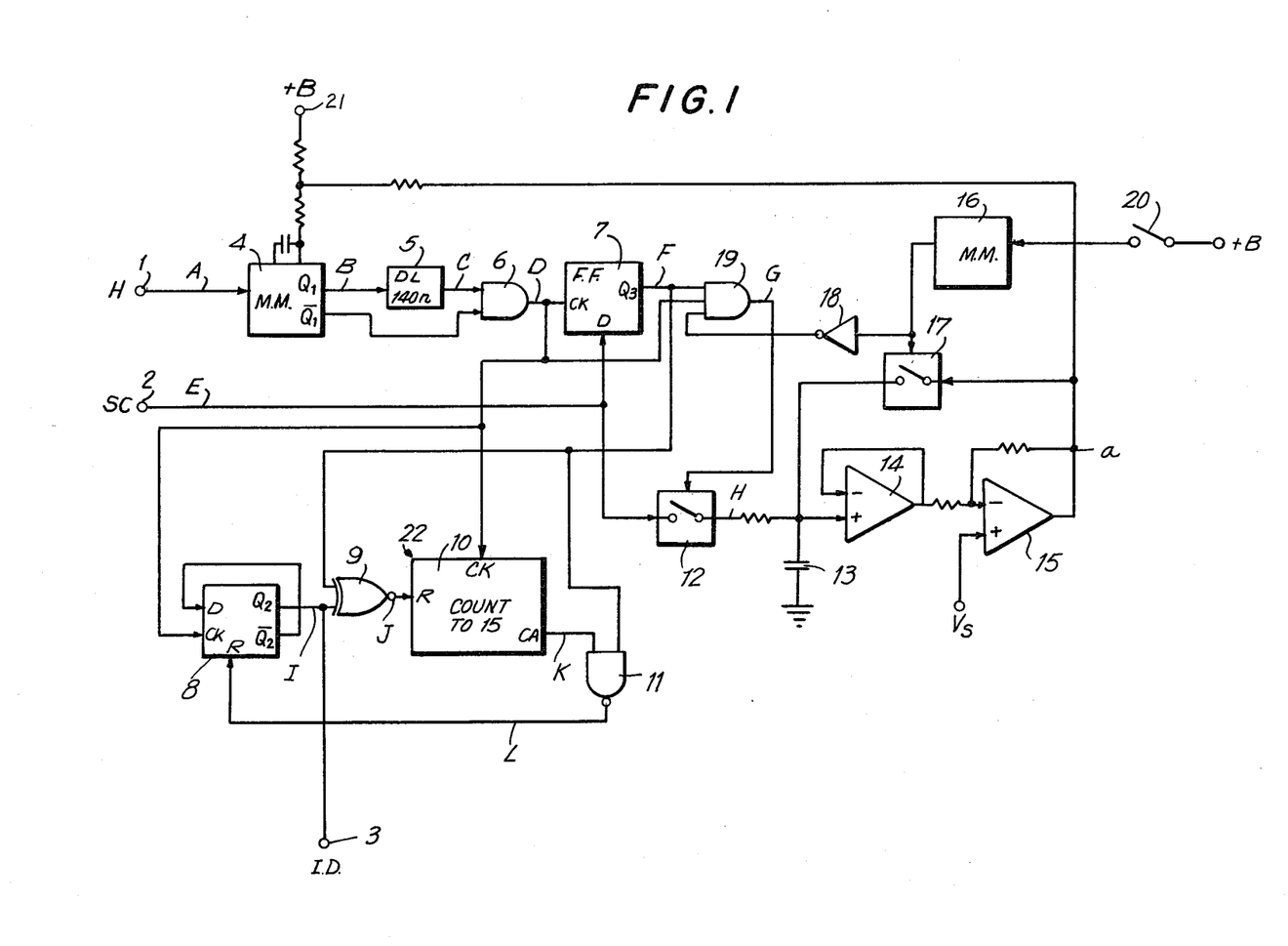
FIG. 1 is a logic diagram of one embodiment of the present invention.

Referring now to the drawings, FIG. 1 is a logic diagram of one embodiment of apparatus for producing a line identification signal to identify whether a horizontal line interval of a color television signal is odd or even, based upon whether the chrominance, or color, subcarrier signal present during that line interval exhibits a first or second phase relationship. For the present discussion, it will be assumed that the composite color television signal with which the illustrated apparatus is used is the NTSC signal wherein the color subcarrier signal is phase-inverted from one line to the next. The phase of the color subcarrier signal during odd line intervals is designated herein as "positive" phase, and the phase of the color subcarrier signal during even line intervals is designated as "negative" phase. In the NTSC system, it is appreciated that such positive and negative phases are 180° are out-of-phase with respect to each other.

The apparatus illustrated in FIG. 1 is comprised of a phase detector circuit, an automatic phase adjustment circuit and a noise immunity circuit. The phase detector circuit is comprised of a sampling pulse generator, comprised of a monostable multivibrator 4, a delay circuit 5 and an AND gate 6, and a sampling circuit comprised of a D-type flip-flop circuit 7. The automatic phase adjustment circuit is comprised of an enabling switch 12, an integrator circuit including a capacitor 13, a buffer amplifier 14, an amplifier 15 and a switch control AND gate 19. Noise prevention circuit 22 is comprised of a D-type flip-flop circuit 8, an exclusive-NOR gate 9, a counter 10 and a NAND gate 11.

Monostable multivibrator 4, included in the phase detector circuit, has an input coupled to an input terminal 1 and is adapted to be triggered to its quasi-stable state in response to the trailing edge of a horizontal synchronizing signal supplied to input terminal 1. Although not shown herein, it will be appreciated that conventional synchronizing signal separator circuitry may be provided to separate the horizontal synchronizing signal from the usual composite color television signal. In addition, the color subcarrier signal is adapted to be supplied to an input terminal 2. Preferably, this color subcarrier signal may be the usual continuous-wave color subcarrier which is phase-locked to the usual burst signal included in the composite color television signal. That is, this color subcarrier signal may be generated by a conventional burst oscillator. Alternatively, the burst signal may be supplied to input terminal 2.

Monostable multivibrator 4 exhibits a controllable time constant. That is, after being triggered in response to the trailing edge of the horizontal synchronizing signal supplied thereto, the monostable multivibrator produces a positive-going pulse at its $Q_1$ output, the duration of this pulse being dependent upon the time constant of the monostable multivibrator circuit. A source of operating potential $+B$ is supplied to this monostable multivibrator, and to the illustrated time constant circuit thereof, via a power supply terminal 21. It is appreciated that the time constant circuit is adapted to receive a controlling voltage which, as will be described below, is supplied via the automatic phase adjustment circuit from point a so as to control the time constant of the monostable multivibrator. Thus, the duration of the output pulse generated by monostable multivibrator 4 at its output terminal $Q_1$ (as well as the complement of this output pulse generated at output terminal $\overline{Q_1}$) is determined as a function of the control voltage supplied from the automatic phase adjustment circuit to the time constant circuit of the monostable multivibrator.

The $Q_1$ output of monostable multivibrator 4 is coupled to one input of AND gate 6 via delay circuit 5. This delay circuit exhibits a delay time on the order of about 140 nsec. In the NTSC system, the color subcarrier frequency is about 3.58 MHz; and the delay time of 140 nsec. is equal to about one-half cycle, or period, of the color subcarrier. Thus, delay circuit 5 delays the output pulse generated at the $Q_1$ output of monostable multivibrator 4 by approximately a half cycle of the color subcarrier signal.

The output input of AND gate 6 is connected directly to the $\overline{Q_1}$ output of monostable multivibrator 4. It will be explained below that the AND gate functions to produce a "window" pulse which is used in the automatic phase adjustment control to detect relative phase shifts between the color subcarrier signal supplied to input terminal 2 and the horizontal synchronizing signal supplied to input terminal 1, as well as phase shifts which may appear in the window pulse due to temperature drift, or the the like.

The leading edge of the window pulse generated by AND gate 6 also is used as a sampling pulse for sampling the phase of the color subcarrier signal. To this effect, the output of the AND gate is coupled to the clock input CK of D-type flip-flop circuit 7. As is known, a D-type flip-flop circuit functions to assume the logic state of a logic signal supplied to its D input at the time that a clock pulse transition, such as a positive-going transition, is applied to its clock input CK. In FIG. 1, the D input of flip-flop circuit 7 is coupled to input terminal 2 to receive the color subcarrier signal. For optimum operation of flip-flop circuit 7, the color subcarrier signal is amplitude-limited so as to alternate between relatively higher and lower levels, thereby exhibiting a rectangular waveform.

The $Q_3$ output of flip-flop circuit 7 is coupled to one input of AND gate 19, the other input of which is coupled to the output of AND gate 6. The $Q_3$ output of this flip-flop circuit also is coupled to the noise prevention circuit.

AND gate 19 functions to selectively enable the operation of the automatic phase adjustment circuit, and is provided with an output coupled to a switch control terminal of switching circuit 12. This switching circuit is diagrammatically represented as having a movable contact which is closed when AND gate 19 supplies a binary "1" to the switch control terminal. Switching circuit 12 is coupled to input terminal 2 so as to transmit the color subcarrier signal when actuated, or closed. The output of switching circuit 12 is coupled to the illustrated integrator circuit which includes integrating capacitor 13. The output of this integrating circuit is coupled, via buffer amplifier 14, to amplifier 15. Amplifier 15 is illustrated as an operational amplifier having a non-inverting input coupled to receive a reference, or offset, voltage $V_s$, and an inverting input coupled to the output of buffer amplifier 14 so as to receive the output of the integrator circuit. The output of amplifier 15 is connected to point a which, as described above, is connected to the time constant circuit of monostable multivibrator 4. Thus, depending upon the voltage produced at point a at the output of amplifier 15, the time constant of monostable multivibrator 4 is correspondingly established.

The automatic phase adjustment circuit also includes a monostable multivibrator 16 whose input is coupled via a selector switch 20 to the power supply terminal for receiving operating voltage +B. Switch 20 may comprise a conventional power, or on/off, switch for the apparatus with which the illustrated circuitry is used. When switch 20 is closed, monostable multivibrator 16 is triggered to produce an output pulse. Preferably, this monostable multivibrator exhibits a relatively long time constant, for example, a time constant on the order of two seconds. Thus, the output pulse produced by monostable multivibrator 16 exhibits a pulse duration equal to about two seconds. This pulse is supplied to a switch 17, similar to aforedescribed switch 12, which, when closed, functions to connect point a at the output of amplifier 15 to capacitor 13 included in the integrator circuit. Switch 17 is opened, or deactuated, upon the termination of the pulse produced by monostable multivibrator 16. This pulse also is inverted by logic inverter 18 and supplied to a third input of AND gate 19. Thus, during the two second duration of this pulse, AND gate 19 is inhibited, or disabled, so as to produce a binary "0". At the termination of the output pulse produced by monostable multivibrator 16, inverter 18 supplies a binary "1" to AND gate 19, thereby enabling the AND gate to function in its usual manner.

D-type flip-flop circuit 8 is similar to aforedescribed flip-flop circuit 7, and additionally includes a reset input R. The D input of flip-flop circuit 8 is coupled to the $\overline{Q_2}$ output thereof, and the clock input CK is coupled to the output of AND gate 6 so as to be "clocked" or triggered in response to the positive-going transition of the window pulse produced by this AND gate. The reset input R is coupled to the output of NAND gate 11 and is adapted to supply a negative-going reset pulse to flip-flop circuit 8 so as to reset this flip-flop circuit to an initial condition. This initial, or reset, condition is represented by a high level binary "1" signal at the $\overline{Q_2}$ output.

The $Q_2$ output of flip-flop circuit 8 is coupled to an output terminal 3 and is adapted to supply a noise-immune line identification signal thereto. For the purpose of the present discussion, it will be assumed that, if a binary "1" signal is supplied to output terminal 3 from the $Q_2$ output of flip-flop circuit 8, an odd line interval is identified thereby. Conversely, if the line identification signal is a binary "0", an even line is identified. This $Q_2$ output also is coupled to one input of exclusive-NOR gate 9. The other input of this exclusive-NOR gate is coupled to the $Q_3$ output of flip-flop circuit 7.

Exclusive-NOR gate 9 functions as a comparator to compare the state of flip-flop circuit 7 to the state of flip-flop circuit 8. This exclusive-NOR gate produces a binary "1" when the compared states are equal (e.g. both flip-flop circuits supply a binary "1" or a binary "0" to the exclusive-NOR gate) and produces a binary "0" when the compared states are different. The output of exclusive-NOR gate 9 is coupled to the reset input R of counter 10. This counter includes a clock input CK coupled to the output of AND gate 6 to receive each window pulse generated thereby. The count of counter 10 is incremented in response to, for example, the negative-going transition of the window pulse. This counter may be a typical binary counter adapted to count from an initial, reset count of zero to a maximum count of 15. When its maximum count is reached, counter 10 produces an "overflow" signal at its "carry output" CA. This overflow signal, which represents that the maximum count of 15 has been reached, is supplied to one input of NAND gate 11. The other input of this NAND gate is connected to the $Q_3$ output of flip-flop circuit 7.

Counter 10 is of the type which remains fixed, or locked, at its initial reset count of zero when the signal to its reset input R is a binary "1". However, when this reset signal changes over to a binary "0", counter 10 is enabled thereby to count the pulses supplied to its clock input CK.

Figure 2:
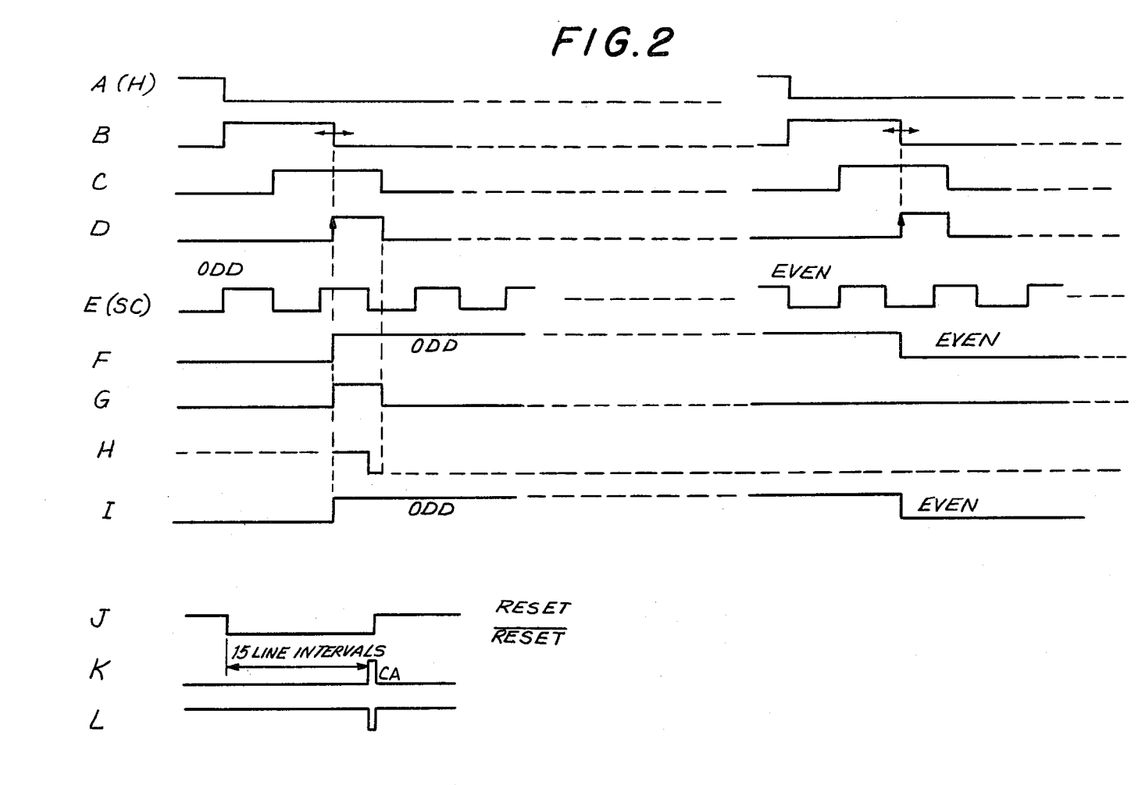
FIGS. 2A-2L are waveform diagrams representing signals produced by various ones of the components shown in FIG. 1.

The manner in which the illustrated circuitry operates now will be described with reference to the waveform diagrams shown in FIGS. 2A-2L. FIG. 2A represents the negative-going transitions of the horizontal synchronizing signals H supplied to input terminal 1. For the purpose of the present discussion, each horizontal synchronizing signal may be a positive pulse whose trailing edge is represented by the illustrated negative-going transitions. Of course, successive horizontal synchronizing signals define the horizontal line intervals during which the useful video information is transmitted. Also, the burst signal is transmitted on the back porch of the horizontal synchronizing signal. The color subcarrier signal derived from this burst signal is illustrated in FIG. 2E as the subcarrier signal SC. For convenience, the line interval defined by the left-most horizontal synchronizing signal transition is assumed to be an odd line; and the line interval which follows the right-most horizontal synchronizing signal transition is designated the even line. From FIG. 2E, it is appreciated that the phase of the subcarrier signal is inverted in the even line with respect to that of the odd line.

The negative transition of the horizontal synchronizing signal shown in FIG. 2A triggers monostable multivibrator 4 so as to produce the pulse illustrated in FIG. 2B. The time duration of the pulses shown in FIG. 2B is variable in accordance with the control signal supplied to the time constant circuit from point a at the output of amplifier 15. Depending upon this control voltage, the duration of the pulses shown in FIG. 2B may be increased or decreased, as represented by the illustrated arrows. The pulses shown in FIG. 2B are subjected to a delay in delay circuit 5. As discussed above, this delay is equal to about 140 nsecs, which imparts a delay on the order of about one-half of a color subcarrier signal cycle. The delayed pulse is illustrated in FIG. 2C. This delayed pulse is supplied to AND gate 6 together with an inverted version of the pulse shown in FIG. 2B. As a result, AND gate 6 generates the pulse shown in FIG. 2D. It is appreciated that the duration of the pulse shown in FIG. 2D is determined by the delay of delay circuit 5 which has been assumed to be equal to, for example, 140 nsecs. Furthermore, the time of occurrence of the pulse shown in FIG. 2D is determined by the time of occurrence of the trailing edge of the pulse shown in FIG. 2B. Thus, if the duration of the pulse shown in FIG. 2B is reduced, the pulse shown in FIG. 2D remains fixed at its 140 nsecs duration, but is shifted to the left. Conversely, if the duration of the pulse shown in FIG. 2B is increased, the pulse shown in FIG. 2D is shifted to the right. This pulse shown in FIG. 2D, of fixed duration but adjustable time-of-occurrence, is designated herein as the window pulse.

This window pulse, shown in FIG. 2D, is supplied to the clock input CK of flip-flop circuit 7. Concurrently, the color subcarrier signal shown in FIG. 2E is supplied to the D input of this flip-flop circuit. Depending upon the state, or phase, of the color subcarrier signal at the time-of-occurrence of the leading edge of the window pulse shown in FIG. 2D, flip-flop circuit 7 assumes a corresponding state. The leading edge of the window pulse is designated the sampling pulse. Thus, as shown in FIG. 2F, since the color subcarrier signal is in its positive half cycle at the time of occurrence of the sampling pulse, flip-flop circuit 7 is set such that a binary "1" is produced at the $Q_3$ output. If, however, the color subcarrier signal had been in its negative half cycle at the time of occurrence of the sampling pulse, as represented in the right-hand portion of FIGS. 2C–2F, flip-flop circuit 7 will be reset so as to produce a binary "0" at its $Q_3$ output. Thus, the phase of the color subcarrier signal is sampled by the sampling pulse, and flip-flop circuit 7 either is set or reset, depending upon the phase of the sampled colored subcarrier signal. It is seen that if a phase shift occurs between, for example, the horizontal synchronizing signal and the color subcarrier signal, the time-of-occurrence of the sampling pulse may be shifted such that, during the odd line interval, the negative half cycle of the color subcarrier signal is sampled. Also, if the operating characteristics of the illustrated circuitry change, such as because of temperature drift, aging, or the like, the time-of-occurrence of the sampling pulse with respect to the color subcarrier signal may shift such that, even though an odd line is present, the negative half cycle of the color subcarrier signal may be sampled. Such phase shift between the horizontal synchronizing signal and the color subcarrier signal, or between the sampling pulse and the color subcarrier signal is compensated by the automatic phase adjustment circuit.

Before describing the operation of this automatic phase adjustment circuit, the manner in which noise prevention circuit 22 operates will be described. It is appreciated that the window pulse, shown in FIG. 2D, is supplied to the clock input CK of flip-flop circuit 8. Hence, the state of this flip-flop circuit is changed in response to each such pulse. If flip-flop circuit 8 initially is in its reset state, and if the horizontal synchronizing signal supplied to input terminal 1 is included in an odd line, flip-flop circuit 8 will change its state such that the signal produced at the $Q_2$ output thereof changes over from a binary "0" to a binary "1". From FIG. 2F, it is seen that, when an odd line is received, the $Q_3$ output of flip-flop circuit 7 likewise is changed over to a binary "1".

At the next line interval, the window pulse produced by AND gate 6, and shown in FIG. 2D, triggers flip-flop circuit 8 to change over such that the $Q_2$ output now produces a binary "0". Since this next line interval is assumed to be an even line, flip-flop circuit 7 likewise is changed over such that the $Q_3$ output produces a binary "0", as shown in FIG. 2F.

This alternation in the state of flip-flop circuit 8 continues at each line interval. Since the state of flip-flop circuits 7 and 8 have been assumed herein to be equal, exclusive-NOR gate 9 supplies a binary "1" to the reset input R of counter 10, thereby "forcing" the counter to retain its reset count of zero. FIG. 2J illustrates this reset signal, with a substantially compressed time axis.

Since counter 10 remains reset, flip-flop circuit 8 continues to alternate in the aforedescribed manner. Hence, even if disturbances occur in the signal produced at the $Q_3$ output of flip-flop circuit 7 (FIG. 2F), which signal is a representation of the detected phase of the color subcarrier signal, such disturbances do not appear in the output signal produced at the $Q_2$ output of flip-flop circuit 8 (FIG. 2I). Thus, this line identification signal at the $Q_2$ output of flip-flop circuit 8 is seen to be substantially immune to noise disturbances, such as spurious noise interference which may be present in the horizontal synchronizing signal, the color subcarrier signal, or the like.

In the foregoing, it has been assumed that flip-flop circuit 8 initially exhibits its reset state, and that the first line interval which is processed by the phase detector circuitry has been assumed to be an odd line interval. Let it now be assumed that flip-flop circuit 8 initially exhibits its reset state, but that the first line interval processed by the phase detector circuitry is an even line interval, such as shown in the right-hand portion of FIGS. 2A–2I. As discussed above, the color subcarrier signal, shown in FIG. 2E, is in its negative half cycle at the time that the sampling pulse (FIG. 2D) is generated. Consequently, flip-flop circuit 7 is reset to produce a binary "0" at its $Q_3$ output. This binary "0" is representative of an even line interval.

However, at this time, the sampling pulse shown in FIG. 2D triggers flip-flop circuit 8 to change over from its initial, reset state such that the $Q_2$ output thereof produces a binary "1". Exclusive-NOR gate 9 now is supplied with a binary "1" from flip-flop circuit 8 and a binary "0" from flip-flop circuit 7. This difference in the states of flip-flop circuits 7 and 8 is due to the fact that the first line interval which is processed by the phase detector circuit is an even line interval and not an odd line interval which has been previously assumed. Exclusive-NOR gate 9 supplies a binary "0" to the reset input R of counter 10 (FIG. 2J). Thus, the counter now is enabled to count the window pulses supplied thereto at the beginning of each successive line interval.

At the next line interval, the detected phase of the color subcarrier is such that the line is indicated as being odd, thereby changing over the output of flip-flop circuit 7 from a binary "0" to a binary "1". Now, however, the window pulse supplied to flip-flop circuit 8 triggers this flip-flop circuit to change over from a binary "1" to a binary "0". This difference in the states of the flip-flop circuits is sensed by exclusive-NOR gate 9 which maintains a binary "0" enabling signal at the reset input R of count 10. Hence, the counter continues to be incremented.

After 15 successive phase-detecting operations are carried out, counter 10 will be incremented to a count of 15. Thereafter, in response to the next window pulse, the counter supplies an overflow signal to NAND gate 11. This overflow signal is shown in FIG. 2K. At the next phase detection operation, flip-flop circuit 7 will produce a binary "1", indicative of a received odd line interval. NAND gate 11 thus is enabled to supply the negative-going reset pulse shown in FIG. 2L to the reset input R of flip-flop circuit 8. At this time, flip-flop circuit 8 exhibits its reset state and, but for the reset pulse supplied thereto, normally would change over in the manner discussed above. However, this reset pulse forces flip-flop circuit 8 to remain in this reset condition even during the next line interval which is detected, by flip-flop circuit 7, as an even line interval. Hence, both flip-flop circuit 7 and flip-flop circuit 8 supply binary "0"s to exclusive-NOR gate 9. This, of course, terminates the enable signal which had been supplied to the reset input R of counter 10, as shown in FIG. 2J. The counter now is reset and inhibited from counting the window pulses supplied to its clock input.

From the foregoing description, it is appreciated that, even if flip-flop circuit 8 is not synchronized with flip-flop circuit 7, after a predetermined number of phase detections are carried out, that is, after a predetermined number of line intervals are received, flip-flop circuit 8 will be forced into a synchronized condition. Thereafter, it is expected that both flip-flop circuits will change state concurrently, and in phase synchronism. That is, the line identification signal produced at the $Q_2$ output of flip-flop circuit 8 will be substantially identical to the phase-detected output signal produced at the $Q_3$ output of flip-flop circuit 7.

In the event that spurious noise interference causes the states of flip-flop circuits 7 and 8 to differ from each other, the foregoing operation will be carried out once again. However, if this spurious noise interference merely is of a brief duration, and is less than the predetermined number of line intervals which result in the overflow signal produced by counter 10, such that the flip-flop circuits return to phase synchronism prior to the generation of this overflow signal, counter 10 then will be reset to its initial zero count, and the flip-flop circuits will continue to operate in synchronism with each other.

Thus, it is seen that circuit 22 functions as a noise prevention, or noise immunity circuit.

Now, the operation of the automatic phase adjustment circuit will be described. Let it be assumed that monostable multivibrator 16 produces a binary "0" output. The purpose of this monostable multivibrator and the manner in which it affects the operation of the illustrated circuitry will be described below. If the output of this monostable multivibrator is assumed to be a binary "0", inverter 18 supplies an enabling binary "1" to AND gate 19. Thus, the AND gate is enabled to transmit a window pulse (FIG. 2D) during those line intervals in which flip-flop circuit 7 produces a binary "1". From the foregoing discussion, it is seen that the output of this flip-flop circuit (FIG. 2F) is a binary "1" during odd line intervals. Thus, AND gate 19 is enabled, during odd line intervals, to transmit the window pulse shown in FIG. 2D. This transmitted window pulse is illustrated in FIG. 2G.

The output of the AND gate functions as an enabling pulse to close, or actuate, enabling switch 12. It is appreciated that enabling switch 12 is actuated only for the duration of the enabling pulse shown in FIG. 2G, which duration is equal to the duration of the window pulse shown in FIG. 2D. Consequently, enabling switch 12 transmits that portion of the color subcarrier signal which is shown in FIG. 2H. That is, the transmitted portion includes a section of the positive half cycle and a section of the negative half cycle of the color subcarrier signal. This transmitted portion of the color subcarrier signal, as shown in FIG. 2H, is supplied to capacitor 13. The capacitor integrates the transmitted portion of the color subcarrier signal so as to be charged during the positive half cycle and discharged during the negative half cycle. The resultant charge remaining on capacitor 13, that is, the voltage produced across this capacitor, is dependent upon the location of the window pulse shown in FIG. 2D relative to the period of the color subcarrier signal shown in FIG. 2E. That is, the voltage across capacitor 13 is representative of the relative phase between the horizontal synchronizing signal and the color subcarrier signal, or the relative phase between the sampling pulse and the color subcarrier signal.

The voltage is supplied to amplifier 15 via buffer amplifier 14 and is subtracted from the offset voltage $V_s$. Thus, since the offset voltage is fixed, the output voltage at point a is determined by the voltage across capacitor 13. That is, the voltage at point a is a function of the relative phase of the color subcarrier signal with respect to the horizontal synchronizing signal or with respect to the sampling pulse. This voltage at point a is fed back as a control voltage to control the time constant of monostable multivibrator 4. This output voltage at point a is supplied, as aforedescribed, to the time constant circuit of monostable multivibrator 4. Depending upon this output voltage at point a, the time constant of this monostable multivibrator is adjusted accordingly so as to correspondingly adjust the duration of the output pulse produced thereby and shown in FIG. 2B. It is appreciated, therefore, that, depending upon the voltage produced across capacitor 13, the time-of-occurrence of the window pulse (FIG. 2D) is correspondingly established.

Let it be assumed that a relative phase shift occurs between the horizontal synchronizing signal supplied to input terminal 1 and the color subcarrier signal supplied to input terminal 2. Because of this phase shift, that portion of the color subcarrier signal which is supplied to capacitor 13 by enabling switch 12 may differ from what is illustrated in FIG. 2H. As an example, let it be assumed that the aforementioned relative phase shift corresponds to a change in the position of the window pulse (FIG. 2D) relative to the color subcarrier signal (FIG. 2E) such that the window pulse appears to shift toward the left. As a result of this, the charging voltage supplied to capacitor 13, that is, the positive half cycle of the color subcarrier signal, now will be substantially greater than the discharging voltage supplied thereto, that is, the negative half cycle of the subcarrier signal. Hence, capacitor 13 will be charged to a higher voltage level. This higher voltage level is subtracted from offset voltage $V_s$, resulting in a lower voltage at point a. This lower voltage, when supplied to the time constant circuit of monostable multivibrator 4, results in a greater time constant thereof, thus increasing the duration of the output pulse shown in FIG. 2B. Thus, it is seen that, because of this increase in the pulse duration output, the window pulse (FIG. 2D) is shifted to the right. That is, the phase of the window pulse is adjusted with respect to the color subcarrier signal so as to restore the proper phase relationship therebetween. Consequently, even though a relative phase shift may be imparted between the horizontal synchronizing signal and the color subcarrier signal, the automatic phase adjustment circuit compensates for this phase shift.

Conversely, let it be assumed that, because of temperature drift, atmospheric disturbances, spurious noise, or the like, a relative phase shift is present between the horizontal synchronizing signal and the color subcarrier signal which results in an effective shift in the window pulse (FIG. 2D) to the right. Because of this shift, enabling switch 12 now supplies capacitor 13 with a charging voltage (the positive half cycle of the color subcarrier signal) which is of lesser duration than the discharging voltage (the negative half cycle of the color subcarrier signal). As a result of this, the voltage across capacitor 13 now is reduced. This reduced voltage level is subtracted from the offset voltage $V_s$, thereby supplying a higher voltage at point a. This higher voltage, when fed back to the time constant circuit of monostable multivibrator 4, tends to reduce the time constant thereof. Accordingly, the duration of the pulse generated by this monostable multivibrator (FIG. 2B) is reduced so as to shift the window pulse (FIG. 2D) toward the left. This shift in the window pulse tends to restore the proper phase relationship between the window pulse and the color subcarrier signal.

Thus, it is appreciated that the automatic phase adjustment circuit tends to compensate for phase shifts which appear between the color subcarrier signal and the horizontal synchronizing signal, or between the color subcarrier signal and the window pulse.

It should be recognized that, even while the aforedescribed automatic phase adjustment operation is carried out, the line identification operation, described in detail hereinabove, also is executed. Indeed, the automatic phase adjustment operation ensures that the line identification operation is conducted accurately.

The purpose of monostable multivibrator 16 now will be described. When power switch 20 is closed, the abrupt application of power supply voltage +B to the monostable multivibrator triggers this monostable multivibrator to produce an output pulse of relatively long duration. As mentioned above, this output pulse may be on the order of about two seconds. This output pulse, when inverted by inverter 18, inhibits switch control AND gate 19. Thus, enabling switch 12 remains opened so as to prevent the color subcarrier signal from being supplied to the automatic phase adjustment circuit. Moreover, the output pulse produced by monostable multivibrator 16 closes switch 17 so as to feed back the voltage at point a to capacitor 13. This fedback voltage is subtracted from the offset voltage $V_s$, resulting in a stable, constant voltage at point a. This constant voltage is supplied to the time constant circuit of monostable multivibrator 4, thereby fixing the time duration of the output pulse (FIG. 2B) generated thereby. Since this output pulse duration remains fixed, the window pulse (FIG. 2D) is generated at each line interval at the same, constant space location relative to the negative transition of the horizontal synchronizing signal.

It is appreciated, therefore, that during the two-second duration of the output pulse generated by monostable multivibrator 16, the automatic phase adjustment operation is inhibited. Nevertheless, the line identification operation continues in the manner described hereinabove. Furthermore, noise prevention circuit 22 continues to generate a line identification signal at output terminal 3 which is substantially immune from spurious noise interference which might occur.

The purpose of inhibiting the phase adjustment operation for the aforementioned duration is to allow the noise prevention circuit, and particularly the operation of flip-flop circuit 8, to become synchronized with the phase detector circuit, and particularly, synchronized with the operation of flip-flop circuit 7. It is anticipated that the aforementioned two-second duration is sufficient to enable such synchronization. Thereafter, once flip-flop circuits 7 and 8 are synchronized with each other, the automatic phase adjustment circuit is enabled to operate in the aforementioned manner. If the automatic phase adjustment circuit had not been inhibited for the initial two-second duration, it is possible that synchronization between flip-flop circuits 7 and 8 would be delayed because of the adjustment which would be made in the time-of-occurrence of the sampling pulse as a result of the automatic phase adjustment operation.

From the foregoing description, it is seen that the apparatus illustrated in FIG. 1 functions to provide an accurate, substantially noise-immune indication of the identity of each line interval of a color television signal. The illustrated apparatus functions to detect the phase of the color subcarrier signal of the composite color television signal, and phase shifts which would otherwise impair this phase detection operation are compensated by an automatic phase adjustment operation. Still further, this automatic phase adjustment operation is carried out only during predetermined line intervals, such as only during odd line intervals, as detected by the aforementioned phase detector circuit. Thus, stable, accurate line identification is attained.

While the present invention has been particularly shown and described with reference to a preferred embodiment, it will be readily appreciated by those of ordinary skill in the art that various changes and modifications may be made in form and details without departing from the spirit and scope of the invention. For example, the predetermined count to which counter 10 counts before generating the overflow signal may be modified, as desired. Likewise, the initial inhibit duration, during which the automatic phase adjustment operation is not carried out, may be modified or, if desired, may be omitted. Still further, various alternative circuit elements may be used in place of those which are illustrated in FIG. 1. It is, therefore, intended that the appended claims be interpreted as including these as well as other changes and modifications.

What is claimed is:

1. Apparatus for indicating whether the phase of the color subcarrier signal of a color television signal is positive or negative, comprising: phase detecting means for detecting the phase of the color subcarrier signal which is present at a predetermined time following the occurrence of the horizontal synchronizing signal of said color television signal and for producing a phase indicating signal; and automatic phase adjustment means for sensing relative phase shifts between said horizontal synchronizing signal and said color subcarrier signal and for adjusting the actual time at which the phase of said color subcarrier signal is detected in accordance with sensed relative phase shifts.

2. The apparatus of claim 1 wherein said phase detecting means includes noise immunity means for receiving the phase indicating signal and for producing an output phase identification signal in response to and substantially immune to spurious noise interference in said phase indicating signal, said phase identification signal indicating the detected phase of said color subcarrier signal.

3. The apparatus of claim 2 wherein said noise immunity means comprises synchronizing means for synchronizing said phase identification signal to said phase indicating signal; and means for changing over said phase identification signal between positive and negative phase identifications, once it has been synchronized with said detected phase of said color subcarrier signal, in response to successive horizontal synchronizing signals of said color television signal.

4. The apparatus of claim 3 wherein said synchronizing means comprises comparator means for comparing said phase identification signal to said phase indicating signal and for providing signals representative thereof; means for determining when a predetermined number of successive phase identification signals differ from said phase indicating signal; and means for changing over the phase identification provided by said phase identification signal in response to said determining means.

5. The apparatus of claim 4 wherein said determining means comprises counter means whose count is incremented in response to each detection of the phase of said color subcarrier signal and whose count is reset to an initial count when said phase identification signal corresponds to said phase indicating signal; said counter means producing a change signal when the count thereof reaches a predetermined count.

6. The apparatus of claim 4 wherein said means for changing over said phase identification signal comprises bistate means whose state is changed between first and second states in response to each detection of the phase of said color subcarrier and whose state is forced to a predetermined one of said first and second states when said determining means determines that a predetermined number of successive phase identification signals have differed from said phase indicating signal.

7. The apparatus of claim 1 wherein said automatic phase adjustment means comprises sensing means for sensing when the detected phase of said color subcarrier signal is a predetermined phase; and enabling means for enabling the adjustment of the actual time at which the phase of said color subcarrier signal is detected only during those intervals wherein said detected phase of said color subcarrier signal is equal to said predetermined phase.

8. The apparatus of claim 7 wherein said phase detecting means comprises pulse generating means having an adjustable time constant and triggered by said horizontal synchronizing signal to generate a sampling pulse at a predetermined time following the triggering thereof as determined by said time constant, said time constant being adjusted by said automatic phase adjustment means; and sampling means for sampling the phase of said color subcarrier signal in response to said sampling pulse.

9. The apparatus of claim 8 wherein said automatic phase adjustment means further comprises window pulse generating means for generating a window pulse in accordance with said sampling pulse; averaging means for producing a signal level representing the average of the color subcarrier signal that is present during said window pulse; and means for adjusting the time constant of said pulse generating means in accordance with said signal level, thereby adjusting the time at which the phase of said color subcarrier signal is sampled and the time at which said window pulse is generated.

10. The apparatus of claim 9 wherein said averaging means comprises an integrator circuit.

11. The apparatus of claim 9 wherein said enabling means comprises gate means enabled to apply said color subcarrier signal to said averaging means in response to said window pulse but only when said sensing means senses that the detected phase of said color subcarrier signal is said predetermined phase.

12. The apparatus of claim 8 wherein said sampling means comprises a clock-controlled flip-flop circuit having a clock input coupled to receive said sampling pulse and a data input coupled to receive said color subcarrier signal.

13. Apparatus for producing a line identification signal to identify whether a horizontal line interval of a color television signal is an odd or even line, based upon whether the color subcarrier signal present during that line interval exhibits a first or second phase relationship, said apparatus comprising sampling means responsive to a sampling pulse for sampling the color subcarrier signal to produce a first phase-representing signal when said color subcarrier signal exhibits said first phase relationship and to produce a second phase-representing signal when said color subcarrier signal exhibits said second phase relationship; sample pulse generating means triggered by the horizontal synchronizing signal included in said color television signal and having an adjustable time constant to generate a sample pulse at a time determined by said time constant, said sampling pulse being applied to said sampling means; automatic phase adjustment means for sensing phase shifts between said sampling pulse and said color subcarrier signal to adjust said time constant of said sample pulse generating means so as to cancel said phase shifts; enabling means for enabling said automatic phase adjustment means to sense said phase shifts only during those line intervals in which said color subcarrier signal exhibits a predetermined phase relationship; and noise prevention means responsive to said first and second phase-representing signals to produce a corresponding line identification signal that is substantially immune to spurious noise interference that may be present in said phase-representing signals.

14. The apparatus of claim 13 wherein said noise prevention means comprises bistate means whose state is changed at each horizontal line interval; coincidence means for detecting coincidence between the state of said bistate means and said phase-representing signal; and means for changing over the state of said bistate means if said coincidence means fails to detect coincidence for a predetermined number of line intervals; the state of said bistate means being used to produce said line identification signal.

15. The apparatus of claim 14 further comprising selector switch means selectively operative to inhibit the operation of said phase adjustment means for a predetermined period of time and thereby enable said bi-state means to be brought into coincidence with said phase-representing signal during said predetermined period of time.

16. The apparatus of claim 13 wherein said automatic phase adjustment means comprises window pulse generating means for generating a window pulse of predetermined duration when said sampling pulse is generated; gating means responsive to said window pulse for gating said color subcarrier signal; integrating means for integrating the gated color subcarrier signal; and means for producing a time constant adjustment signal for adjusting the time constant of said sample pulse generating means as a function of the integrated, gated color subcarrier signal.

* * * * *